(12) United States Patent
Park et al.

(10) Patent No.: US 7,692,754 B2
(45) Date of Patent: Apr. 6, 2010

(54) LIQUID CRYSTAL DISPLAY AND FABRICATING METHOD THEREOF

(75) Inventors: Soon Young Park, Gyeongsangnam-do (KR); Gwang Tae Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 768 days.

(21) Appl. No.: 11/638,518

(22) Filed: Dec. 14, 2006

(65) Prior Publication Data

US 2007/0279543 A1 Dec. 6, 2007

(30) Foreign Application Priority Data

Jun. 5, 2006 (KR) ...................... 10-2006-0050603

(51) Int. Cl.
*G02F 1/135* (2006.01)
*G02F 1/1339* (2006.01)
*G02F 1/13* (2006.01)

(52) U.S. Cl. ....................... 349/153; 349/190; 349/182; 349/40

(58) Field of Classification Search ................. 349/153, 349/190, 192

See application file for complete search history.

(56) References Cited

U.S. PATENT DOCUMENTS

| | | | |
|---|---|---|---|
| 5,946,057 A * | 8/1999 | Kusanagi ...................... 349/40 |
| 7,486,368 B2 * | 2/2009 | Sakakura et al. ............ 349/153 |
| 2004/0125299 A1 * | 7/2004 | Nakamura et al. .......... 349/139 |
| 2004/0169809 A1 * | 9/2004 | Yamabuchi et al. ......... 349/153 |

* cited by examiner

*Primary Examiner*—Julie-Huyen L Ngo
(74) *Attorney, Agent, or Firm*—Holland & Knight LLP

(57) ABSTRACT

A liquid crystal display device includes lower and upper substrates facing each other; signal lines disposed on the lower substrate, a conducting sealant, including conductive balls, applied between the lower substrate and the upper substrate, and a static electricity guiding line formed in an area on the lower substrate where the conductive sealant overlaps the signal lines.

20 Claims, 9 Drawing Sheets

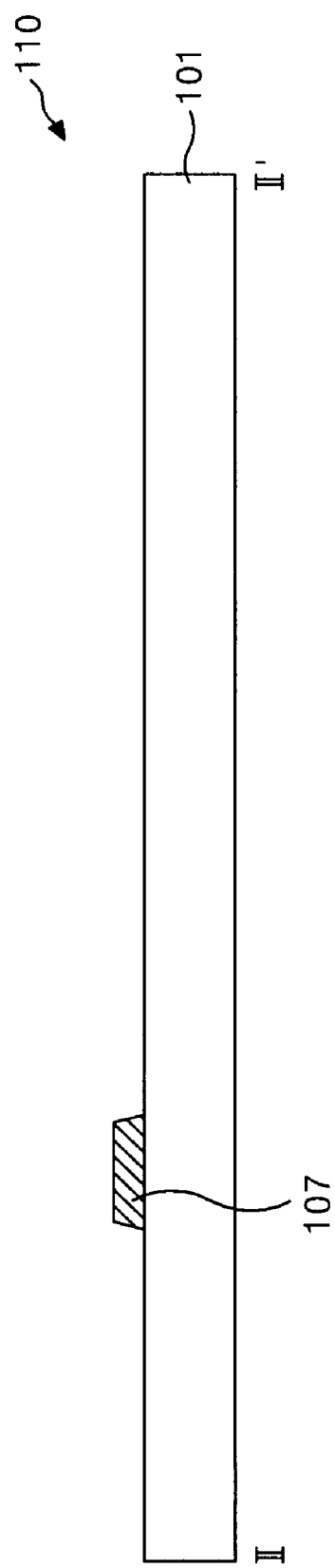

LIQUID CRYSTAL DISPLAY AND FABRICATING METHOD THEREOF

This application claims the benefit of Korean Patent Application No. P06-0050603, filed on Jun. 5, 2006, which is hereby incorporated by reference in its entirety.

BACKGROUND OF THE INVENTION

1. Field of the Invention

The embodiments of the invention relate to a display device, and more particularly, to a liquid crystal display device and fabricating method thereof. Although embodiments of the invention are suitable for a wide scope of applications, it is particularly suitable for preventing electric short of a gate line or a data line due to static electricity.

2. Description of the Related Art

Generally, a liquid crystal display device includes a thin film transistor array substrate and a color filter substrate array that face each other along with a liquid crystal material between the two substrates. FIG. 1 is a plan view illustrating a liquid crystal display device of the related art and FIG. 2 is a cross sectional view along line I-I' of FIG. 1. Referring to FIG. 1 and FIG. 2, a thin film transistor array substrate 10 includes gate lines (GL) and data lines (DL) crossing each other on a lower substrate 1, a thin film transistor (T) positioned adjacent to where the data lines (DL) and the gate lines (GL) cross each other, and liquid crystal cells (C) disposed in the areas defined between the crossing data lines (DL) and gate lines (GL). Each liquid crystal cell (C) includes a pixel electrode (not shown) connected to the drain electrode of the thin film transistor (T) on the thin film transistor array substrate 10, a common electrode 14 formed on the color filter array substrate 20 and a layer of liquid crystal, which is located between the pixel electrode and the common electrode 14. Driving signals are provided to the gate lines (GL) and the data lines (DL) by the driving circuit (not shown). Gate pads (GP) in the non-display area are connected to gate lines (GL) extending from the display area. Data pads (DP) in the non-display area are connected to data lines (DL) extending from the display area. The driving circuit is connected to the gate pads (GP) and the data pads (DP). The thin film transistor is turned on by a scan signal provided on the gate line (GL) so that a data signal on the data line (DL) is provided to the pixel electrode connected to the thin film transistor.

The color filter array substrate 20 has a black matrix 12 that divides the upper substrate 11 into cell areas. Color filters (not shown) are formed in the cell areas partitioned by the black matrix 12. A common electrode 14 is positioned on the color filters for forming a vertical electric field with the pixel electrode on the lower substrate 1 to drive the liquid crystal layer between the common electrode 14 and the pixel electrode.

The thin film transistor array substrate 10 has a common line (CL) to provide the standard voltage to the common electrode 14, which is formed on the color filter array substrate 20 in the non-display area outside of the display area. The common line (CL) is formed in an area in which a conductive sealant 26 is coated onto the color filter array substrate 20. The conductive sealant 26 joins the thin film transistor array substrate 10 to the color filter array substrate 20. The common line (CL) is electrically connected to the common electrode 14 of the color filter array substrate 20 through conductive balls 25 in the conductive sealant 26. More specifically, the common line (CL) includes a common line lower electrode 7 formed in the same layer as the gate line (GL) on the lower substrate 1 and a common line upper electrode 8 contacting the conductive ball 25. A common contact hole 9 in a gate insulating layer 4 and a passivation layer 6 exposes the common line lower electrode 7. The common line upper electrode 8 contacts the common line lower electrode 7 through the common contact hole 9. The conductive ball 25 is formed of a highly conductive metal, such as Au.

The conductive ball 25, which connects the common line (CL) and the common electrode 14 electrically, are disposed throughout the entire area in which the conductive sealant 26 is coated onto the color filter array substrate 20. In other words, the conductive balls 25 are positioned in to overlap areas where the data lines (DL) or the gate lines (GL, refer to FIG. 1) are formed, as shown in FIG. 2.

The passivation layer 6 of the liquid crystal display device can be destroyed due to static electricity occurring on the LCD. FIG. 3 is an illustration of a short between the data line and the common electrode due to an insulating layer being broken by static electricity. If the passivation layer 6 is broken where a conductive ball 25 overlaps a data line (DL), the data line (DL) and the common electrode 14 can be electrically shorted to each other by the conductive ball 25, as shown in FIG. 3. Such a defect, decreases production yield. Further, if the passivation layer 6 and the gate insulation layer 4 are both broken where a conductive ball 26 overlaps a gate lone (GL), the gate line (GL) and the common electrode 14 are electrically shorted by the conductive ball 25 so as to reduce production yield.

SUMMARY OF THE INVENTION

Accordingly, embodiments of the invention is directed to a liquid crystal display device and fabricating method thereof that substantially obviates one or more of the problems due to limitations and disadvantages of the related art.

An object of embodiments of the invention is to prevent a short circuit between the gate line and the common electrode.

Another object of embodiments of the invention is to prevent a short circuit between the data line and the common electrode.

Another object of embodiments of the invention is to improve the production yield of a liquid crystal display device and fabricating method thereof.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display device includes lower and upper substrates facing each other, signal lines disposed on the lower substrate, a conducting sealant, including conductive balls, applied between the lower substrate and the upper substrate, and a static electricity guiding line formed in an area on the lower substrate where the conductive sealant overlaps the signal lines.

In another aspect, a liquid crystal display device includes a lower substrate, signal lines disposed in a display area on the lower substrate, a common line formed in a non-display area outside of the display area on the lower substrate, an upper substrate, a common electrode formed on an upper substrate facing the lower substrate, a conducting sealant, including conductive balls, applied between the lower substrate and the upper substrate in an area at which the common electrode overlaps the common line so that the common electrode is electrically connected to the common line, and a static electricity guiding line formed in an area on the lower substrate where the conductive sealant overlaps the signal line.

In another aspect, a fabricating method of the liquid crystal display device includes forming signal lines in both a display area and a non-display area of a lower substrate, forming an insulation layer over the signal lines in both the display area and non-display area, forming a static electricity guiding line over the signal lines in the non-display area, applying a conducting sealant over the static electricity guiding line in the non-display area, joining the lower substrate to an upper substrate with the conductive sealant.

In another aspect, a fabricating method of the liquid crystal display device includes forming a common electrode on an upper substrate, forming signal lines in a display area on a lower substrate and a common line lower electrode in a non-display area on the lower substrate, forming an insulation layer over the signal lines and the common line lower electrode, forming a common line upper electrode on the insulation layer in the display area and a static electricity guiding line over the signal lines in the non-display area, applying a conducting sealant, including conductive balls, between the lower substrate and the upper substrate where the common electrode overlaps the common line to join the upper substrate and the lower substrate while electrically connecting the common line upper electrode to the common electrode.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIGS. 6a-6d are step by step cross sectional views illustrating a method for manufacturing a liquid crystal display device according to an embodiment of the invention.

DETAILED DESCRIPTION OF THE PREFERRED EMBODIMENTS

Figure 1:
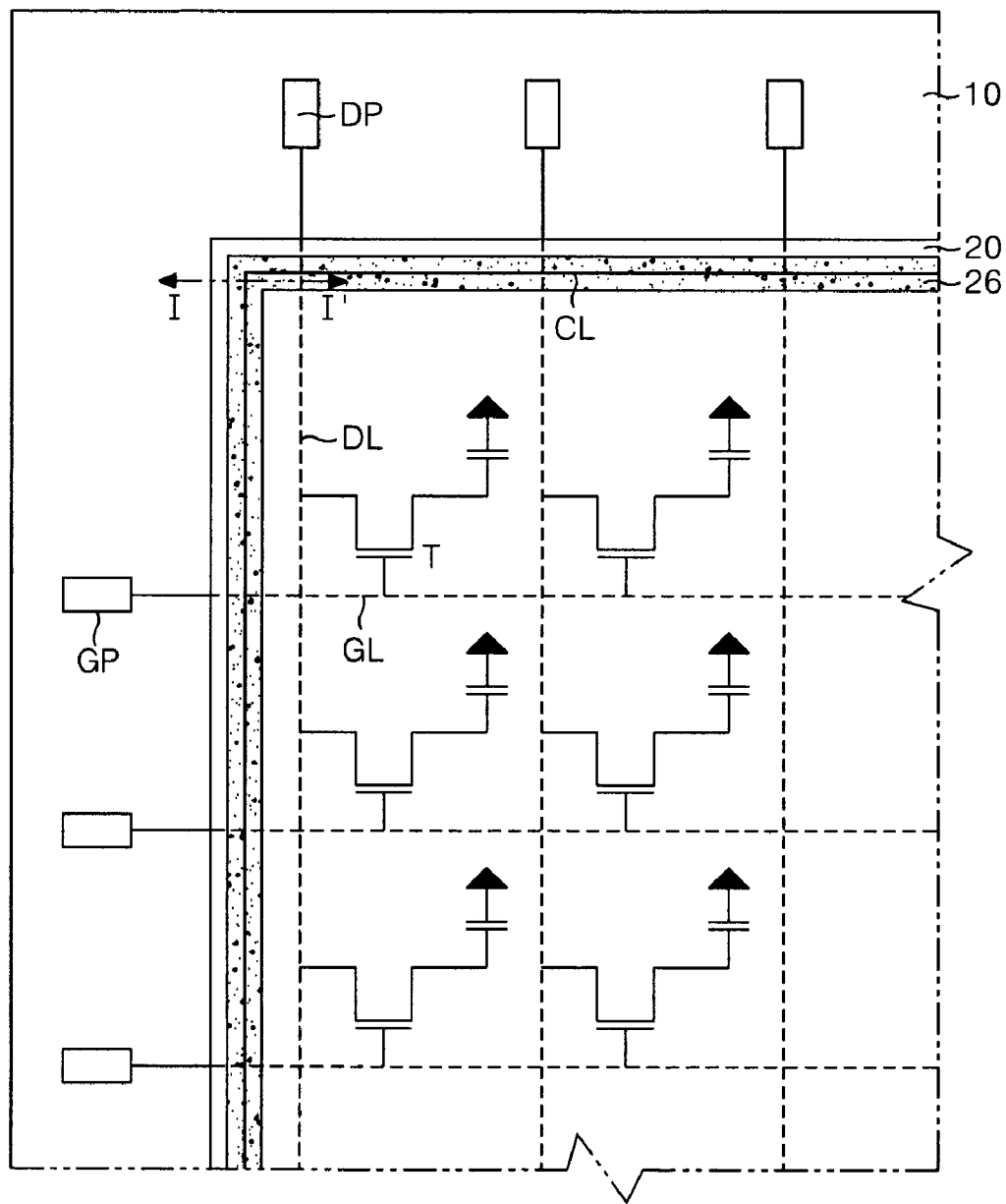
FIG. 1 is a plan view illustrating a liquid crystal display device of the related art.
Figure 2:
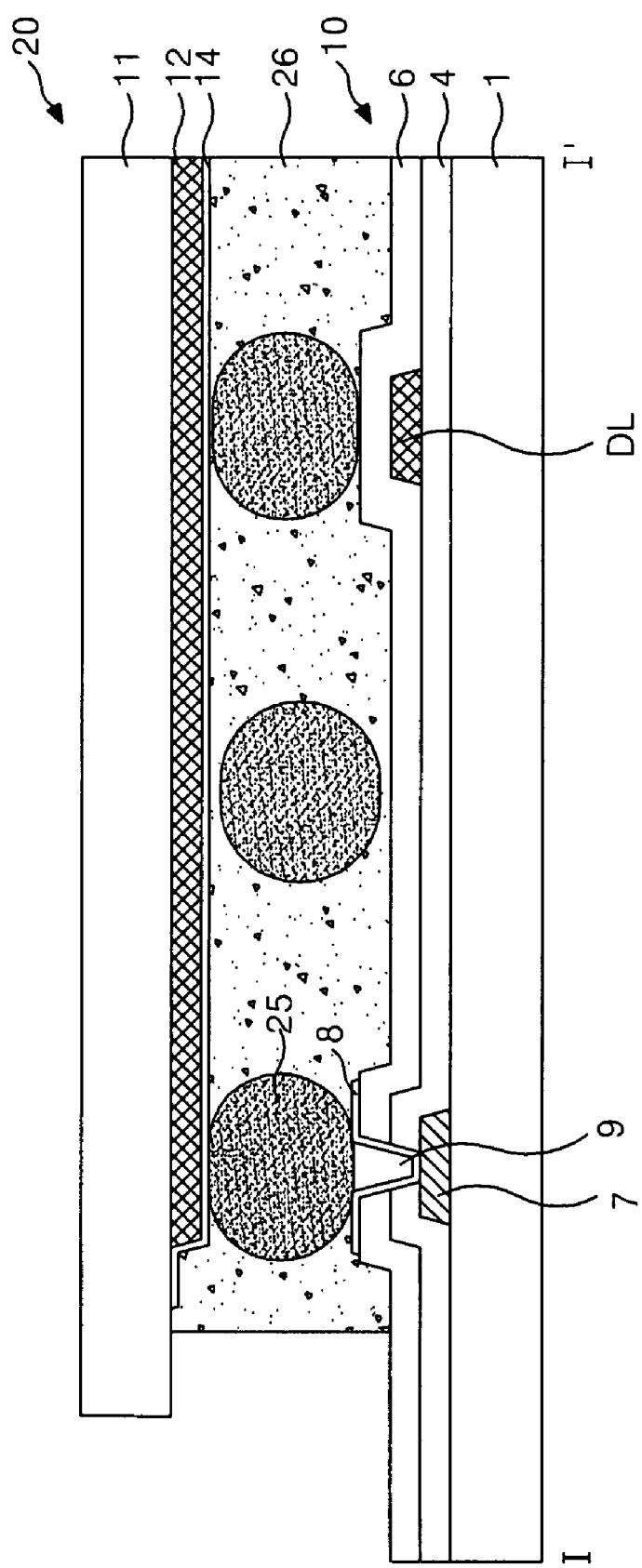
FIG. 2 is a cross sectional view along line I-I' of FIG. 1.
Figure 3:
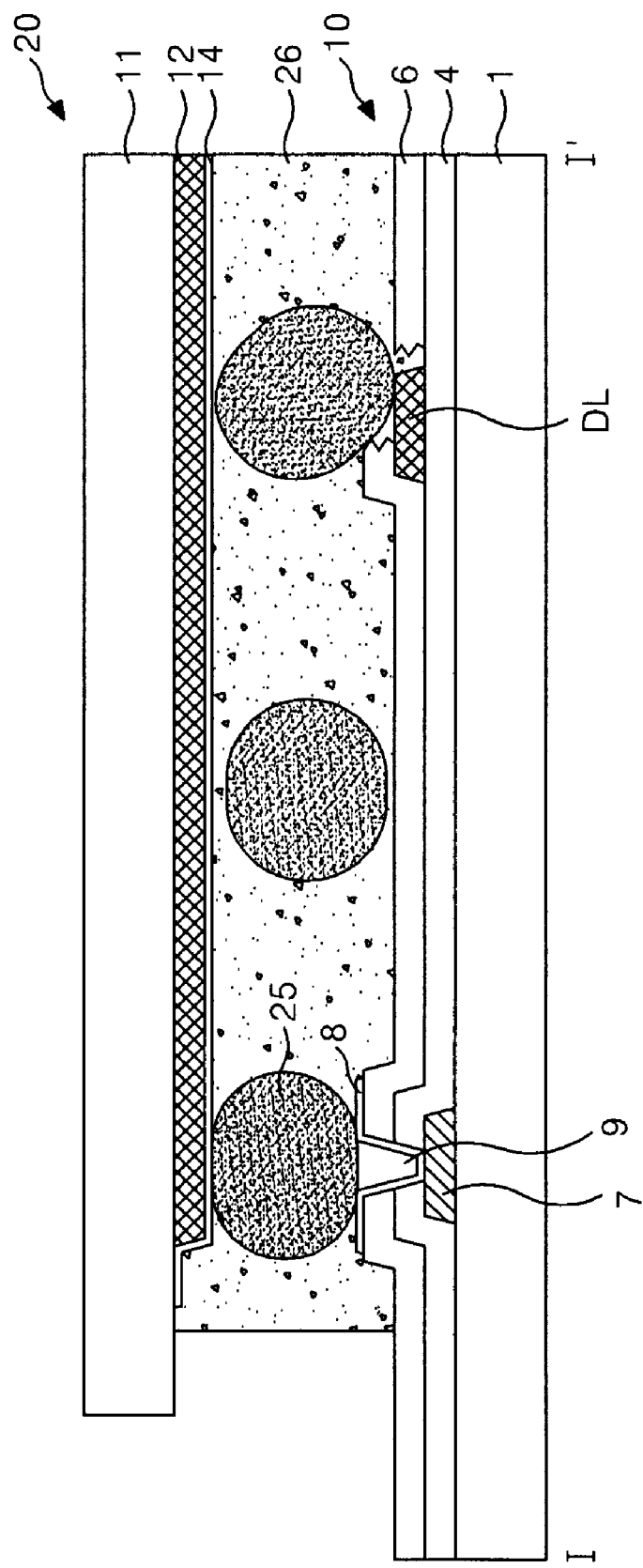
FIG. 3 is an illustration of a short between the data line and the common electrode due to an insulating layer being broken by static electricity.

Reference will now be made in detail to the preferred embodiments of the present invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 4:
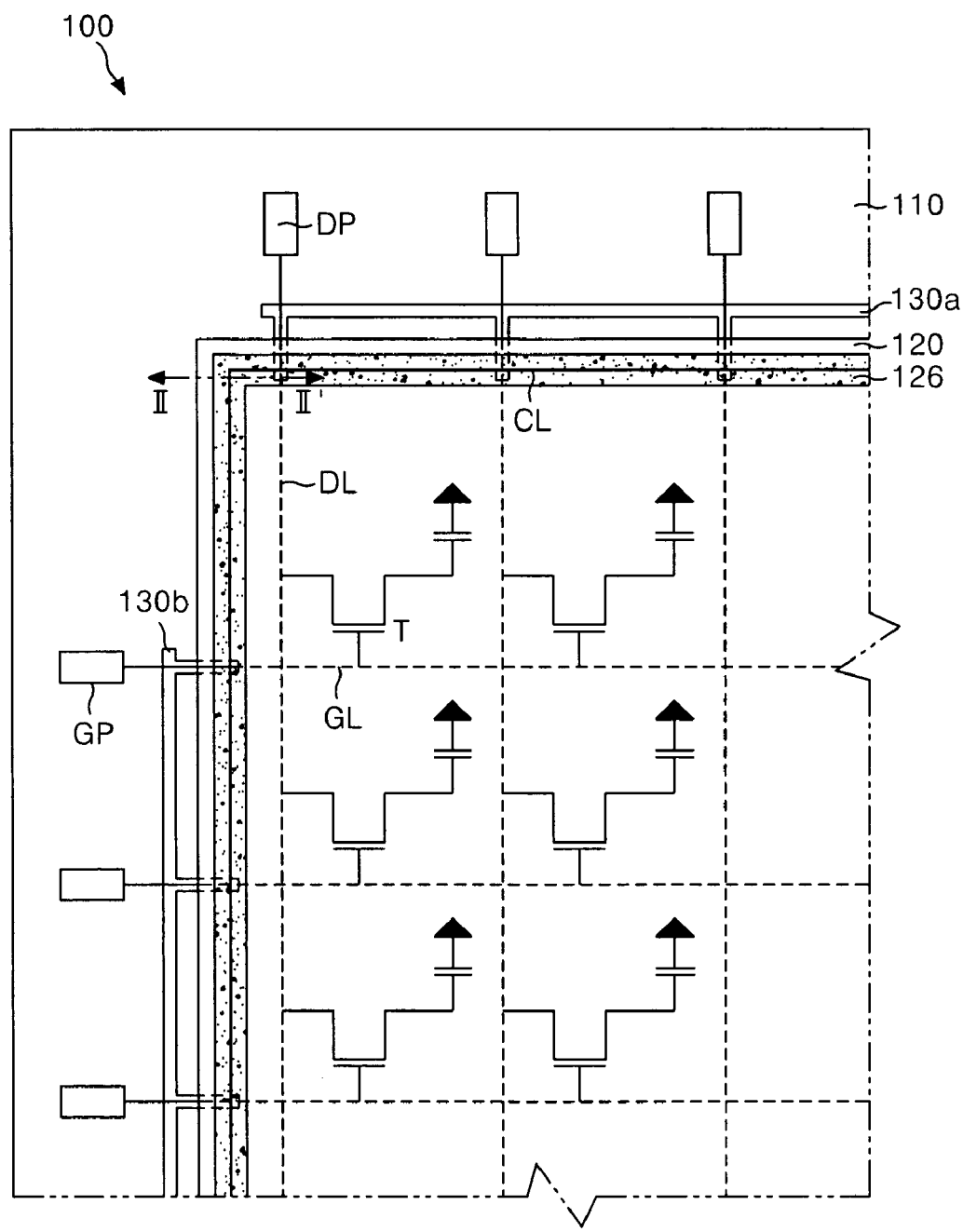
FIG. 4 is a plan view illustrating an LCD according to an embodiment of the invention.
Figure 5:
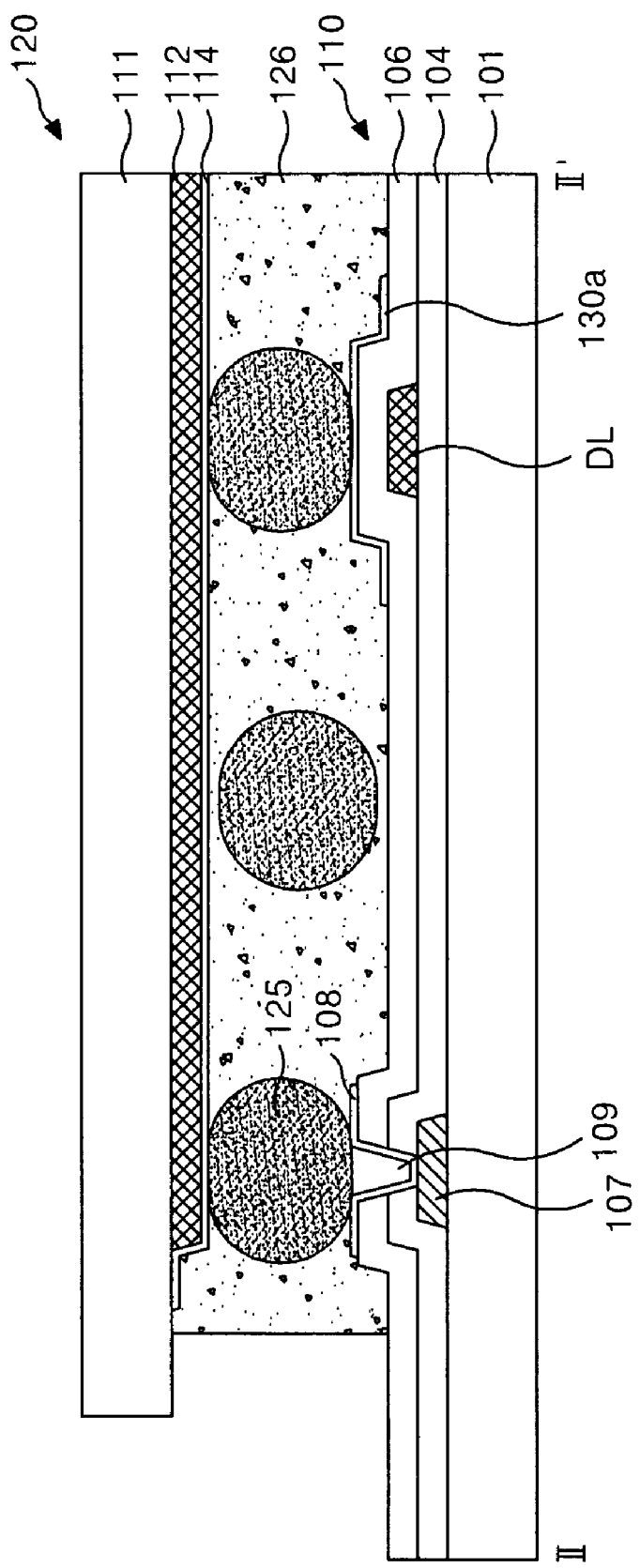
FIG. 5 is a cross sectional view along line II-II' of FIG. 4.

FIG. 4 is a plan view illustrating an LCD according to an embodiment of the invention and FIG. 5 is a cross sectional view along line II-II' of FIG. 4. Referring to FIG. 4 and FIG. 5, a liquid crystal display device 100 includes a thin film transistor array substrate 110 and a color filter substrate array 120 that face each other along with a liquid crystal material (not shown) between the two substrates 110 and 120. The thin film transistor array substrate 110 includes gate lines (GL) and data lines (DL) crossing each other on a lower substrate 101, a thin film transistor (T) positioned adjacent to where the data lines (DL) and the gate lines (GL) cross each other, and liquid crystal cells (C) defined between the crossing data lines (DL) and gate lines (GL). Each liquid crystal cell (C) includes a pixel electrode (not shown) connected to the drain electrode of the thin film transistor (T) on the thin film transistor array substrate 110, a common electrode 114 formed on the color filter array substrate 120 and a layer of liquid crystal material (not shown), which is located between the pixel electrode and the common electrode 114. Driving signals are provided to the gate lines (GL) and the data lines (DL) by driving circuits (not shown). Gate pads (GP) in the non-display area are connected to the gate lines (GL) extending from the display area. Data pads (DP) in the non-display area are connected to the data lines (DL) extending from the display area. The driving circuit is connected to the gate pads (GP) and the data pads (DP).

The color filter array substrate 120 has a black matrix 112 that divides the upper substrate 111 into cell areas. Color filters (not shown) are formed in the cell areas partitioned by the black matrix 112. A common electrode 114 is positioned on the color filters for forming a vertical electric field with the pixel electrode on the lower substrate 1 to drive the liquid crystal layer between the common electrode 114 and the pixel electrode.

The thin film transistor array substrate 110 has a common line (CL) to provide the standard voltage to the common electrode 114, which is formed on the color filter array substrate 120 in the non-display area outside of the display area. The common line (CL) is formed in an area of the color filter array substrate in which a conductive sealant 126 is coated onto the color filter array substrate 120. The conductive sealant 126 joins the thin film transistor array substrate 110 to the color filter array substrate 120. A first static electricity guiding line 130a is patterned onto the thin film transistor array substrate 110 over the data lines (DL) in an area of the thin film transistor array substrate 110 where a conductive sealant 126 will overlap, and a second static electricity guiding line 130b is patterned onto the thin film transistor array substrate 110 over the gate lines (GL) in an area of the thin film transistor array substrate 110 where the conductive sealant 126 will overlap. More specifically, the first and second static electricity guiding lines 130a and 130b are on a passivation layer 6, which is over the gate lines (GL) and the data line (DL).

The common line (CL) is electrically connected to the common electrode 114 of the color filter array substrate 120 through conductive ball 125 in the conductive sealant 126. More specifically, the common line (CL) includes a common line lower electrode 107 formed in the same layer as the gate line (GL) on the lower substrate 101 and a common line upper electrode 108 contacting the conductive ball 25. A common contact hole 109 in the gate insulating layer 104 and passivation layer 106 exposes the common line lower electrode 107. The common line upper electrode 108 contacts the common line lower electrode 107 through the common contact hole 109. The conductive ball 125 is formed of a highly conductive metal, such as Au.

The first static electricity preventing line 130a patterned to overlap the data lines (DL) on the passivation layer 106 in the area in which the conductive sealant 126 will be disposed is connected to a ground terminal (GND) of the data driving circuit (not shown). The second static electricity preventing line 130b patterned to overlap the gate lines (GL) on the passivation layer 106 in the area at which the conductive sealant 126 will be disposed is connected to the ground terminal (GND) of the gate driving circuit (not shown). The first and second static electricity preventing lines 130a and 130b are formed in the same layer as the common line upper electrode 108 of the common line (CL).

Static electricity can not occurs in the areas where the conductive balls 126 overlap the gate and data lines (DL) because of the first and second static electricity guiding lines 130a and 130b on the passivation layer 106. Thus, the first and second static electricity guiding lines 130a and 130b prevent the passivation layer 106 from being destroyed since any static electricity is drained away to grounds of the driving circuit. Accordingly, the liquid crystal display device according to embodiments of the invention prevents the conductive balls 125 and signal lines, either the data line (DL) or the gate line (GL), from being shorted to each other so that production yield is not decreased due to static electric breakdown of the passivation layer.

Figure 6B:
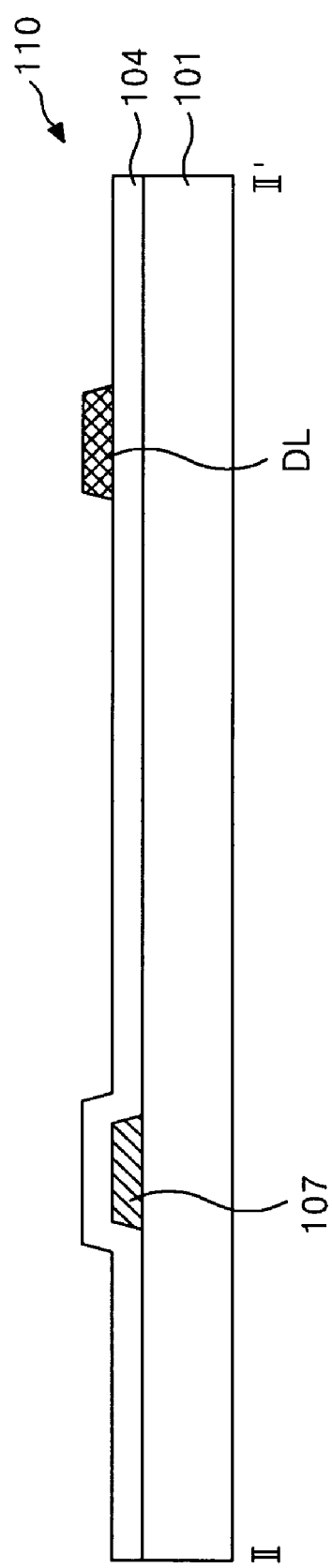

FIGS. 6a-6d are step by step cross sectional views illustrating a method for manufacturing a liquid crystal display device according to an embodiment of the invention. Referring to FIG. 6a, a common line lower electrode 7 and gate line (GL, as shown in FIG. 4) is formed by photolithography and etching after depositing a gate metal layer on a lower substrate 101 with a deposition method, such as plasma enhanced chemical vapor deposition (PECVD) and sputtering. Materials, such as Cr, Mo, Al, or AlNd, can be used for the gate metal layer.

A gate insulation layer 104 is formed on the lower substrate 101 on which the gate line (GL) and a common line lower electrode 7 are formed by a deposition method, such as PECVD and sputtering. A source/drain metal layer is then formed through photolithography and etching to form a data line (DL), as shown FIG. 6b. Metals, such as Mo or Cu, are used for the source/drain metal layer.

Figure 6C:
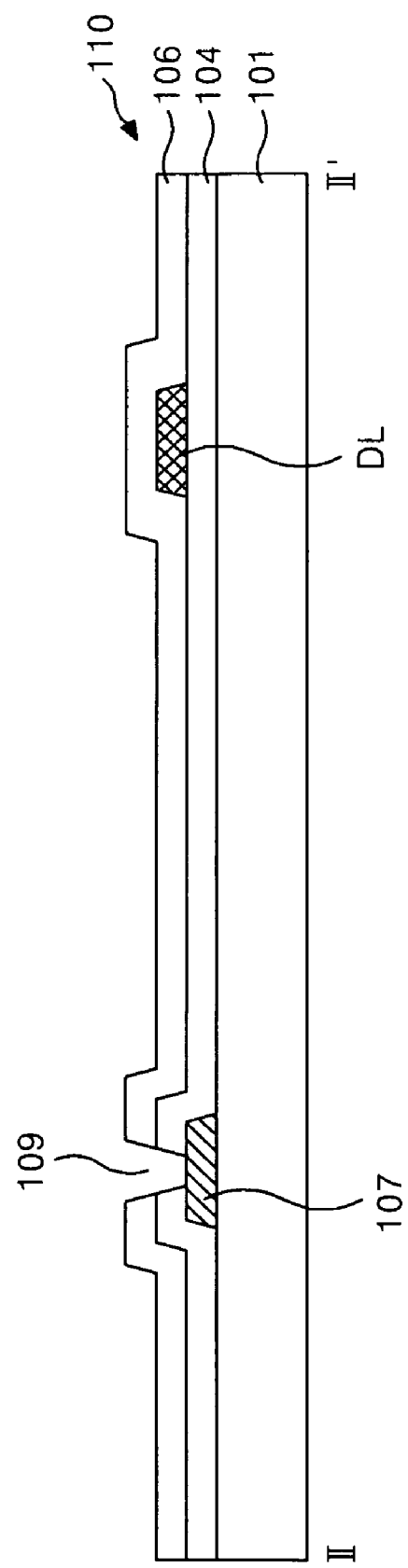

A passivation layer 106 is deposited over the lower substrate 101 on which the data line (DL) has been formed. Then, the passivation layer 106 and the gate insulation layer 104 are patterned through photolithography and etching. As a result of the passivation layer patterning, a common contact hole 109 exposing a common line lower electrode 107 is formed, as shown in FIG. 6c.

Figure 6D:
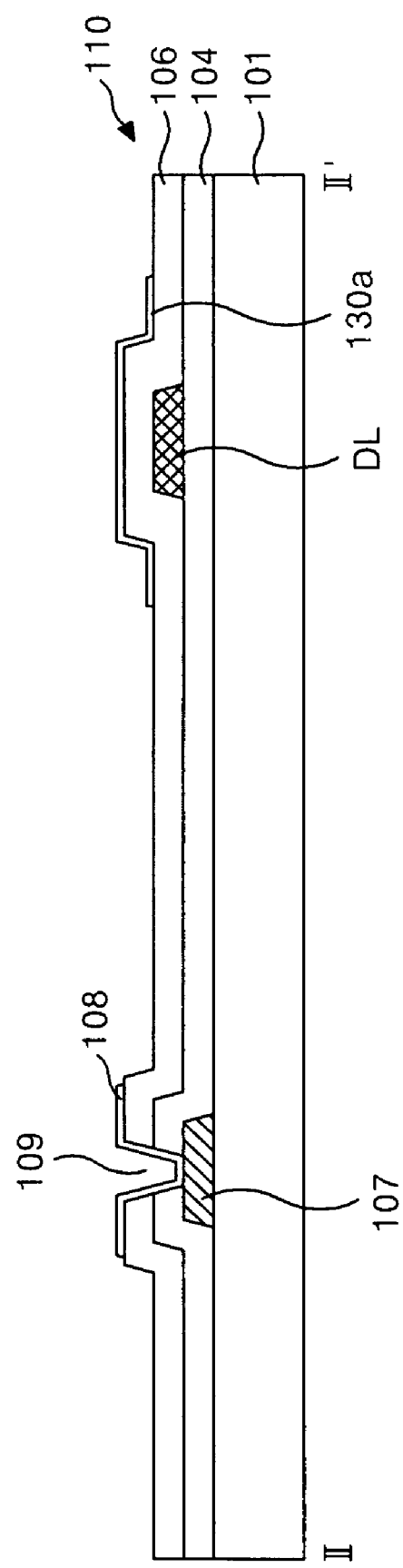

A transparent conductive material is deposited over the lower substrate 101 on which the common contact hole 109 was formed by a deposition method, such as PECVD or sputtering. Then, the transparent conductive material is patterned by photolithography and etching to form a common line upper electrode 108 contacting the common line lower electrode 107 through the common contact hole 109, a first static electricity guiding line 130a that overlaps the data line (DL) in the area in which a conductive sealant 126 will later be disposed, and a second static electricity guiding line (130b, refer to FIG. 4) that overlaps the gate line (GL) in the area in which a conductive sealant 126 will later be disposed, as shown in FIG. 6d. The transparent conductive material can be one of Indium Tin Oxide (ITO), Tin Oxide (TO), Indium Tin Zinc Oxide (ITZO) and Indium Zinc Oxide (IZO).

The conductive sealant 126 is then applied over the lower substrate 101 on which the common line upper electrode 108 and the first and second static electricity guiding lines (130a, 130b) are formed. The conductive sealant 126 overlaps the common line (CL) so that connection can be made between the common line (CL) on the thin film transistor array substrate 110 and the common electrode 114 on the upper substrate 120. Further, the conductive sealant 126 overlaps the static electricity guiding lines 130a and 130b in the non-display area. Furthermore, the conductive sealant 126 joins and seals the color filter array substrate 120 to the thin film transistor array substrate 110.

The liquid crystal display device and the fabricating method thereof according to embodiments of the invention includes first and second static electricity guiding lines are provided respectively over the gate and data lines in areas where the conductive sealant overlaps the gate and data lines. The first and second static electricity guiding lines are also respectively connected to ground terminals of the gate and data driving circuits. The first and second static electricity guiding lines prevent static electricity build up in the areas where the conductive sealant overlaps the gate and data lines. Further, it protects the passivation layer in the areas where the conductive sealant overlaps the gate and data lines from being destroyed by the static electricity by redirecting the static electricity occurring in the LCD to the GND terminal of the data driving circuit or the gate driving circuit using the first and second static electricity inducing line. Accordingly, the liquid crystal display device and the fabricating method according to embodiments of the invention prevents electric shorts among the common electrode, data line and gate line so as to manufacture an LCD with high production yield.

It will be apparent to those skilled in the art that various modifications and variations can be made in the a liquid crystal display device and fabricating method thereof in embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display device comprising:
lower and upper substrates facing each other:
signal lines disposed on the lower substrate;
a conducting sealant, including conductive balls, applied between the lower substrate and the upper substrate; and
a static electricity guiding line formed outside of a display area on the lower substrate and having branches that overlap the signal lines and extend toward the display area, wherein the conductive sealant overlaps the branches.

2. The liquid crystal display device according to claim 1, further comprising an insulation layer between the signal lines and the static electricity guiding line.

3. The liquid crystal display device according to claim 1, further comprising a driving circuit formed in the non-display area on the lower substrate for supplying signals to the signal lines, wherein the static electricity guiding line is connected to a ground terminal of the driving circuit.

4. The liquid crystal display device according to claim 1, wherein the static electricity guiding line includes:
a first set of branches formed in an area on the lower substrate where the conductive sealant overlaps data lines of the signal lines; and
a second set of branches formed in an area on the lower substrate where the conductive sealant overlaps gate lines of the signal lines.

5. A liquid crystal display device comprising:

a lower substrate;

signal lines disposed in a display area on the lower substrate;

a common line formed in a non-display area outside of the display area on the lower substrate;

an upper substrate;

a common electrode formed on an upper substrate facing the lower substrate;

a conducting sealant, including conductive balls, applied between the lower substrate and the upper substrate in an area in which the common electrode overlaps the common line so that the common electrode is electrically connected to the common line; and a static electricity guiding line formed in the non-display area on the lower substrate and having branches that overlap the signal lines and extend toward the display area, wherein the conductive sealant overlaps the branches.

6. The liquid crystal display device according to claim 5, further comprising:

a driving circuit formed in the non-display area on the lower substrate for supplying signals to the signal lines.

7. The liquid crystal display device according to claim 6, wherein the static electricity guiding line is connected to a ground terminal of the driving circuit.

8. The liquid crystal display device according to claim 5, wherein the signal lines are gate lines and data lines that cross each other.

9. The liquid crystal display device according to claim 8, wherein the static electricity guiding line includes:

a first set of branches formed in an area on the lower substrate where the conductive sealant overlaps the data lines; and a second set of branches formed in an area on the lower substrate where the conductive sealant overlaps the gate lines.

10. The liquid crystal display device according to claim 5, further comprising an insulation layer between the signal lines and the static electricity guiding line.

11. The liquid crystal display device according to claim 10, wherein the common line includes:

a common line lower electrode formed in a same layer as the gate line; and a common line upper electrode connected to the common electrode through a common contact hole in the insulation layer.

12. The liquid crystal display device according to claim 11, wherein the static electricity guiding line is in a same layer as the common line upper electrode.

13. The liquid crystal display device according to claim 5, wherein the conductive ball is made of Au.

14. A fabricating method of a liquid crystal display device comprising:

forming signal lines in both a display area and a non-display area of a lower substrate;

forming an insulation layer over the signal lines in both the display area and non-display area;

forming a static electricity guiding line in the non-display area having branches that overlap the signal lines and extend toward the display area;

applying a conductive sealant over the branches and the signal lines in the non-display area; and joining the lower substrate to an upper substrate with the conductive sealant.

15. The fabricating method of the liquid crystal display device according claim 14, further comprising providing a driving circuit for supplying signals to the signal lines in the display area on the lower substrate, wherein the static electricity guiding line is connected to the ground terminal of the driving circuit.

16. A fabricating method of a liquid crystal display device comprising:

forming a common electrode on an upper substrate;

forming signal lines in a display area on a lower substrate and a common line lower electrode in a non-display area on the lower substrate;

forming an insulation layer over the signal lines and the common line lower electrode;

forming a common line upper electrode on the insulation layer in the display area and a static electricity guiding line having branches that extend toward the display area and over the signal lines in the non-display area;

applying a conducting sealant, including conductive balls, over the branches, and between the lower substrate and the upper substrate where the common electrode overlaps the common line to join the upper substrate and the lower substrate while electrically connecting the common line upper electrode to the common electrode.

17. The fabricating method of the liquid crystal display device according claim 16, further comprising providing a driving circuit for supplying signals to the signal lines in the display area on the lower substrate, wherein the static electricity guiding line is connected to the ground terminal of the driving circuit.

18. The fabricating method of the liquid crystal display device according claim 16, wherein the method further comprise forming a common contact hole in the insulation layer to expose the common line lower electrode.

19. The fabricating method of the liquid crystal display device according claim 16, wherein the static electricity guiding line is made of a same material as the common line upper electrode.

20. The fabricating method of the liquid crystal display device according claim 16, wherein the conductive balls are formed of Au.

* * * * *